United States Patent [19]

Nakamura et al.

[11] 4,355,146

[45] Oct. 19, 1982

[54] PROCESS FOR REMOVING WATER-SOLUBLE PROTEIN FROM VINYL CHLORIDE RESIN

[75] Inventors: Mamoru Nakamura; Akikatsu Kanayama, both of Takaoka, Japan

[73] Assignee: Nippon Zeon Co. Ltd., Tokyo, Japan

[21] Appl. No.: 144,822

[22] Filed: Apr. 29, 1980

[30] Foreign Application Priority Data

May 2, 1979 [JP] Japan ................................ 54/54487

[51] Int. Cl.³ ............................ C08F 2/20; C08F 6/24; C08F 14/06
[52] U.S. Cl. ................................ 526/199; 526/344.2; 526/344.3; 526/910
[58] Field of Search ............................ 526/199, 344.2

[56] References Cited

U.S. PATENT DOCUMENTS 2,833,754  5/1958  Richards ............................. 526/199
3,534,010 10/1970  Cornell ............................... 526/213
3,663,520  5/1972  Balwe ................................. 526/200

FOREIGN PATENT DOCUMENTS 37-15930 10/1962  Japan ................................. 526/199

Primary Examiner—C. A. Henderson
Attorney, Agent, or Firm—Sherman & Shalloway

[57] ABSTRACT

A process for producing a blending vinyl chloride resin, which comprises subjecting a vinyl chloride monomer or a mixture of vinyl chloride and a monomer copolymerizable therewith to suspension polymerization in an aqueous medium using a water-soluble protein as a suspending agent, and treating the resulting polymer with a proteolytic enzyme.

4 Claims, No Drawings

PROCESS FOR REMOVING WATER-SOLUBLE PROTEIN FROM VINYL CHLORIDE RESIN

BACKGROUND OF THE INVENTION

This invention relates to a process for producing a blending vinyl chloride resin which is suitable for preparing a paste dispersion having superior viscosity properties and which can give molded articles having superior quality.

The important properties of paste vinyl chloride resins (to be referred to simply as a paste PVC) are such that paste dispersions (e.g., plastisols or organosols) formed by blending them with plasticizers, diluents, stabilizers, fillers, etc. have superior rheological properties and can be easily processed at various shear rates under which they are placed in processing (for example, from low shear rates in slush, rotational, dip, casting and sponge moldings to high shear rates in spreading and spray coating operations); they have sufficient flowability even when the amounts of plasticizers and/or diluents are small; and that their viscosities vary little with time. In short, paste PVC should give paste dispersions having superior viscosity properties (i.e., these paste dispersions should have as low an initial viscosity as possible with little change in viscosity over a long period of time). In order that paste dispersions may have superior viscosity properties, paste PVC should have an average particle diameter of 0.1 to 5 microns, preferably 0.2 to 3 microns, a suitable particle diameter distribution, and moderate affinity at its surface with plasticizers. The paste PVC should also be excellent in heat stability during processing and in the color, clarity, strength, etc. of final molded products. For this purpose, the paste PVC should have a low content of impurities.

General practices of producing paste PVC having these properties include, for example, a method which involves adjusting the particle diameter and particle diameter distribution of the paste PVC by the selection of an emulsifier, the improvement of the manner of adding the emulsifier, the use of a seed polymerization method and the selection of conditions for a homogenizer, a dryer or a pulverizer, and a method which is directed to the modification of the surface of the resin particles by adding an emulsifier (mainly a nonionic emulsifier) after polymerization. Paste PVC resins produced by these methods, however, have not proved to be entirely satisfactory in regard to the viscosity properties of paste dispersions prepared therefrom.

In order to improve the viscosity properties of paste dispersions, it is the usual practice to blend such paste PVC with coarse particles of vinyl chloride resins. These vinyl chloride resins in the form of coarse particles are generally called "blending PVC" or "extender PVC". First of all, the blending PVC should preferably be in the form of spherical single particles having a smooth surface in order to increase the effect of reducing the viscosity of paste dispersions. The blending PVC can bring about a greater effect of viscosity reduction as its particle diameter is larger. On the other hand, larger particle diameters cause disadvantages such as the degradation of properties and the reduction of clarity owing to insufficient melting during processing, and the sedimentation of polymer particles in paste dispersions. To avoid these disadvantages, the blending PVC should preferably have an average particle diameter of 10 to 80 microns, particularly 20 to 60 microns, with its particle diameter distribution being not too broad. Furthermore, the surfaces of the particles of the blending PVC should preferably melt easily during processing and have affinity for paste PVC in order to obtain molded articles having excellent strength and clarity.

It is an object of this invention to provide a process for producing a blending PVC having the aforesaid excellent properties.

SUMMARY OF THE INVENTION

According to this invention, there is provided a process for producing a blending vinyl chloride resin, which comprises subjecting a vinyl chloride monomer or a mixture of vinyl chloride and a monomer copolymerizable therewith to suspension-polymerization in an aqueous medium using a water-soluble protein as a suspending agent, and treating the resulting polymer with a proteolytic enzyme. Compounding of a paste PVC with the blending PVC produced by the process of this invention gives a paste dispersion having excellent viscosity properties from which molded articles having superior tensile strength, abrasion resistance, weatherability, water resistance, etc. can be produced.

DETAILED DESCRIPTION OF THE INVENTION

In the process of this invention, a water-soluble protein is used as the suspending agent. Polymer particles suitable for blending are preferably spherical single particles having an average particle diameter of 10 to 80 microns and have a smooth surface. These polymer particles are difficult to obtain unless a water-soluble protein is used as the suspending agent. When polymeric suspending agents such as a partially saponified product of polyvinyl acetate or methyl cellulose or mixtures of these with anionic or nonionic emulsifying agents are used, polymers with the aforesaid particle diameter cannot be obtained, or only polymer particles having an uneven surface are obtained. Examples of suitable water-soluble proteins used in this invention include casein, albumin, silk fibroin, insulin, hemoglobin, gelatin, glue, hydrolyzates of proteins, and polycondensates of amino acids. The water-soluble proteins in this invention also include those proteins which become water-soluble by the selection of pH, the heating of water, etc. The amount of the water-soluble protein somewhat differs depending upon the polymerization conditions such as the polymerization temperature and the stirring mode, the desired particle diameter of the polymer, etc. Generally, its amount is 0.02 to 2 parts by weight per 100 parts by weight of monomers charged. For various purposes, polymeric suspending agents, emulsifiers, plasticizers, etc. may be added jointly in amounts which do not adversely affect the advantages of this invention.

Since the water-soluble proteins are amphoteric electrolytes, the hydrogen ion concentration of the aqueous medium used in the polymerization should be properly controlled in order to obtain the desired particle diameter.

Polymer particles suitable for reducing the viscosity of a paste dispersion can be produced by the above-described process. The use of a water-soluble protein as the suspending agent, however, results in the formation of a surface skin of the residual protein on the surface of the polymer particles to reduce the affinity of the polymer particles for a paste PVC and a plasticizer or to make it difficult to melt the polymer particles during processing. Accordingly, molded particles having fully satisfactory properties cannot be obtained. To solve this problem, it is necessary to decompose the protein remaining on the surface of the polymer particles after the polymerization reaction.

According to the process of this invention, the water-soluble protein used as the suspending agent and remaining on the surface of the resulting polymer particles can be decomposed by a very simple and low-cost method which comprises treating the resulting polymer with a proteolytic enzyme, or protease. Generally, proteins can be hydrolyzed with acids or alkalies, but this requires a long period of time or severe conditions with regard to temperature, concentration, etc. Hence, the use of such a hydrolyzing method in the decomposition of the remaining protein on the polymer surface reduces productivity or degrades the properties of the resulting product. In contrast, the decomposing method in accordance with this invention can be practiced within a short treating period under mild conditions.

Examples of the proteolytic enzyme used in this invention include pepsin, trypsin, chymotrypsin, cathepsin, papain, bromelin, pancreatin, ficin, and proteolytic enzymes derived from microorganisms such as molds, yeasts and bacteria. The joint use of two or more enzymes is sometimes preferred depending upon the types of enzymes or the purpose of using them. The suitable amount of the protease, which may vary with its type, is 0.0001 to 5 parts by weight, preferably 0.0005 to 2 parts by weight, per 100 parts by weight of the polymer. Since an enzymatic reaction is generally affected greatly by such conditions as the pH and the temperature, it is necessary to prescribe a set of treating conditions which is suitable for a given enzyme. Generally, the treating temperature is preferably in the range of 20° to 70° C., and the treating time is several minutes to several hours. Most simply, the protease is added to the slurry after the end of the polymerization reaction, or at times, during the polymerization reaction. It is also possible to add the enzyme to the wet cake left after dehydration or to the resulting polymer after drying. In either case, a suitable amount of water to uniformly wet the surface of the polymer particles and a moderate degree of stirring are required.

The suspension polymerization in the process of this invention is carried out in the presence of catalysts usually employed in the suspension polymerization of vinyl chloride. Examples are organic peroxides such as lauroyl peroxide, 3,5,5-trimethylhexanoyl peroxide, t-butyl peroxy pivalate, diisopropyl peroxy dicarbonate and acetylcyclohexyl sulfonyl peroxide, and azo compounds such as $\alpha,\alpha'$-azobis-isobutyronitrile and $\alpha,\alpha'$-azobis-2,4-dimethylvaleronitrile. These catalysts may be used singly or in mixture with each other.

The monomer copolymerizable with vinyl chloride, as referred to in this invention, encompasses all monomers which are known to be copolymerizable with vinyl chloride. Examples include vinyl esters such as vinyl acetate and vinyl propionate; acrylic acid esters such as methyl acrylate and butyl acrylate; alkylacrylic acid esters such as methyl methacrylate and propyl ethacrylate; unsaturated acids or their esters such as maleic acid, maleic acid esters and fumaric acid esters; vinyl ethers; vinyl halides such as vinyl bromide and vinyl fluoride; vinylidene halides such as vinylidene chloride, vinylidene bromide and vinylidene fluoride; aromatic vinyl compounds; acrylonitrile and methacrylonitrile; and $\alpha$-monolefins such as ethylene, propylene, isobutylene and butene-1.

The process of this invention can also be applied to the graft-copolymerization of vinyl chloride or a mixture of vinyl chloride and a monomer copolymerizable therewith in the presence of a polymer such as vinyl acetate/ethylene copolymer.

The amount of the blending PVC in accordance with this invention to be added to a paste PVC is the one which is sufficient for preparation of a paste dispersion having the desired viscosity properties. Usually, it is 5 to 100 parts by weight per 100 parts by weight of the paste PVC.

The following Examples and Comparative Examples illustrate the present invention more specifically. It should be understood however that these specific examples do not in any way limit the scope of the present invention.

EXAMPLES 1 TO 4 AND COMPARATIVE EXAMPLES 1 AND 2

Water (6 kg) having dissolved therein 15 g of each of the grades of gelatin shown in Table 1 was charged into a 10-liter stainless steel autoclave equipped with stirring impellers. The pH of the solution was adjusted to 12 with ammonia, and 1.2 g of t-butyl peroxy pivalate was added. After deaeration, 3 kg of a vinyl chloride monomer was introduced into the autoclave and its suspension polymerization was started at 58° C. The polymerization was performed until a predetermined conversion was reached. The unreacted monomer was recovered. A part of the resulting polymer slurry was dehydrated and dried (polymer samples in Comparaive Examples 1 and 2). The average particle diameters and maximum particle diameters of the polymers are shown in Table 1. The remaining polymer slurry was adjusted to pH 5 with hydrochloric acid, and ficin, a protease, was added in each of the amounts shown in Table 1 per 100 parts by weight of the polymer. The mixture was stirred at 50° C. to 20 minutes, dehydrated, and then dried (polymer samples of Examples 1 to 4).

Eighty grams of each of these polymer samples was compounded with 120 g of paste PVC having a degree of polymerization of 1800 and obtained by emulsion polymerization, 80 g of dioctyl phthalate and 4 g of a tin-type stabilizer to prepare a paste dispersion. Its viscosity was measured on the first day and seven days later. Furthermore, a paste dispersion prepared in the same way as above was heated at 200° C. for 2 minutes to form a film having a thickness of 0.25 mm, and its properties were measured. The results are shown in Table 1.

The various properties were measured by the following methods.

(1) Particle diameter

The average particle diameter was measured by a wet sieving method. The maximum particle diameter was determined by microscopic observation.

(2) Viscosity of the paste dispersion

Measured by a B-type viscometer at 25° C.

(3) Tensile strength and elongation

Measured substantially in accordance with JIS K-6723.

(4) Water resistance

A film sample was dipped in warm water at 40° C. for 60 minutes, and its light transmittance at a wavelength of 600 m$\mu$ was measured by a Hitachi spectrophotometer.

TABLE 1

|  |  | Comparative Example 1 | Example 1 | Example 2 | Comparative Example 2 | Example 3 | Example 3 |
|---|---|---|---|---|---|---|---|
| Type of gelatin (*1) |  | Grade 5 | Grade 5 | Grade 5 | Grade 4 | Grade 4 | Grade 4 |
| Amount of ficin added (parts by weight) |  | — | 0.01 | 0.05 | — | 0.01 | 0.05 |
| Average particle diameter (microns) |  | 38 | — | — | 26 | — | — |
| Maximum particle diameter (microns) |  | 94 |  |  | 81 |  |  |
| Viscosity of the paste dispersion (cp) (*2) | 1st day | 5200 | 5100 | 5300 | 6700 | 6700 | 6800 |
|  | after 7 days | 9800 | 9700 | 10000 | 13100 | 13200 | 13000 |
| Tensile strength (kg/mm$^2$) |  | 1.6 | 2.9 | 2.7 | 1.4 | 3.0 | 3.2 |
| Elongation (%) |  | 140 | 300 | 305 | 124 | 315 | 330 |
| Water resistance (percent transmittance after dipping in water at 40° C. for 60 minutes) |  | 8.2 | 16.3 | 15.8 | 8.5 | 16.1 | 16.2 |

Notes to Table 1
(*1): In accordance with JIS K-6503.
(*2): A control paste dispersion not containing the blending PVC in accordance with this invention which was composed of 200 g of a paste PVC resin, 80 g of dioctyl phthalate and 4 g of a tin-type stabilizer had a viscosity of 23000 centipoises on the first day and 96500 centipoises after 7 days.

It is seen from the results shown in Table 1 that the blending PVC resins in accordance with this invention obtained by polymerization in the presence of gelatin as a suspending agent and treatment with ficin as a protease gives molded articles having markedly improved tensile strength, water resistance, etc.

COMPARATIVE EXAMPLES 3 AND 4

A 10-liter stainless steel autoclave equipped with stirring impellers was charged with 6 kg of water containing each of the suspending agents or emulsifiers shown in Table 2 dissolved therein and 1.2 g of t-butyl peroxy pivalate. After deaeration, 3 kg of a vinyl chloride monomer was added, and its suspension polymerization was started at 58° C. The polymerization was continued until a predetermined conversion was reached. The unreacted monomer was recovered, and the polymer was dehydrated and dried in a customary manner. The properties of the resulting polymer samples were measured by the same methods as in Example 1. The results are shown in Table 2.

viscosity properties, and cannot give molded articles having good properties.

EXAMPLES 5 AND 6 AND COMPARATIVE EXAMPLE 5

The same autoclave as used in Example 1 was charged with 6 kg of water having dissolved therein 24 g of gelatin (grade 3 specified in JIS K-6503), and the pH of the solution was adjusted to 11 with sodium bicarbonate. Then, 1.5 g of lauroyl peroxide was introduced. After deaeration, 150 g of vinyl acetate monomer and 2.85 kg of vinyl chloride monomer were introduced into the autoclave, and their suspension polymerization was started at 58° C. The polymerization was continued until a predetermined conversion was reached. The unreacted monomer was recovered, and a part of the resulting polymer slurry was dehydrated and dried (polymer sample of Comparative Example 5). The average particle diameter and the maximum particle diameter of this polymer sample are shown in Table 3. The remaining polymer slurry was adjusted to pH 5

TABLE 2

|  |  | Comparative Example 3 | Comparative Example 4 |
|---|---|---|---|
| Suspending agent or emulsifier |  | Methyl cellulose (*1) 3 g Partially saponified product of polyvinyl acetate (*3) 6 g | Methyl cellulose (*2) 9 g Sodium dodecylbenzene-sulfonate 1.5 g |
| Average particle diameter (microns) |  | 82 | 31 |
| Maximum particle diameter (microns) |  | 146 | 87 |
| Viscosity of the paste dispersion (cp) | first day | 9800 | 12500 |
|  | after 7 days | 19300 | 28700 |
| Tensile strength (kg/mm$^2$) |  | 1.7 | 2.8 |
| Elongation (%) |  | 150 | 310 |
| Water resistance (percent transmittance after dipping in water at 40 C. for 60 minutes) |  | 8.8 | 9.2 |

(*1): Its 2% aqueous solution had a viscosity of 25 centipoises at 20° C.
(*2): Its 2% aqueous solution had a viscosity of 400 centipoises at 20° C.
(*3): The degree of saponification 80 mole %; the degree of polymerization 2000.

It is seen from Table 2 that paste dispersions containing polymers obtained by using suspending agents or emulsifiers other than water-soluble proteins had poor with hydrochloric acid, and bromelin was added in each of the amounts indicated in Table 3 per 100 parts by weight of the polymer. The mixture was stirred under the conditions shown in Table 3, dehydrated, and dried (polymer samples of Examples 5 and 6).

Paste dispersions were prepared from these polymer samples, and their properties were measured in the same way as in Example 1. The results are shown in Table 3.

It is seen from the results shown in Table 3 that the polymer samples produced in accordance with the process of this invention have very good properties for use as blending PVC.

TABLE 3

|  |  | Comparative Example 5 | Example 5 | Example 6 |
|---|---|---|---|---|
| Amount of bromelin added (parts by weight) |  | — | 0.002 | 0.01 |
| Stirring conditions | Temperature (°C.) | — | 60 | 40 |
|  | Time (minutes) | — | 10 | 60 |
| Average particle diameter (microns) |  | 22 | — | — |
| Maximum particle diameter (microns) |  | 75 | — | — |
| Viscosity of the paste dispersion (cp) | first day after | 7400 | 7300 | 7400 |
|  | 7 days | 14500 | 14400 | 14400 |
| Tensile Strength (kg/mm$^2$) |  | 1.3 | 2.8 | 2.9 |
| Elongation (%) |  | 160 | 380 | 400 |
| Water resistance (percent transmittance after dipping in water at 40° C. for 60 minutes) |  | 9.5 | 16.4 | 16.3 |

EXAMPLES 7 AND 8 AND COMPARATIVE EXAMPLE 6

The same autoclave as used in Example 1 was charged with 6 kg of water having dissolved therein 24 g of casein from milk. The solution was adjusted to pH 9 with sodium acetate, and 1.2 g of t-butyl peroxy pivalate was introduced. After deaeration, 3 kg of vinyl chloride monomer was introduced, and its suspension polymerization was started at 58° C. The polymerization was continued until a predetermined conversion was reached. The unreacted monomer was recovered, and a part of the polymer slurry obtained was dehydrated and dried (polymer sample of Comparative Example 6). The average particle diameter and maximum particle diameter of this polymer are shown in Table 4. The remaining polymer slurry was adjusted to pH 7 with hydrochloric acid, and bromelin was added in each of the amounts shown in Table 4 per 100 parts by weight of the polymer. The mixture was stirred under the conditions shown in Table 4, dehydrated, and dried (polymer samples of Examples 7 and 8).

Paste dispersions were prepared from these polymer samples, and their properties were measured in the same way as in Example 1. The results are shown in Table 4.

It is seen from the results shown in Table 4 that the polymer samples produced in accordance with the process of this invention have very good properties for use as blending PVC.

TABLE 4

|  |  | Comparative Example 6 | Example 7 | Example 8 |
|---|---|---|---|---|
| Amount of bromelin added (parts by weight) |  | — | 0.001 | 0.0005 |
| Stirring conditions | Temperature (°C.) | — | 50 | 50 |
|  | Time (minutes) | — | 10 | 20 |
| Average particle diameter (microns) |  | 34 | — | — |
| Maximum particle diameter (microns) |  | 82 | — | — |
| Viscosity of the paste dispersion (cp) | first day after | 6300 | 6400 | 6300 |
|  | 7 days | 8100 | 8200 | 8200 |
| Tensile Strength (kg/mm$^2$) |  | 1.5 | 3.1 | 3.0 |
| Elongation (%) |  | 130 | 310 | 300 |
| Water resistance (percent transmittance after dipping in water at 40° C. for 60 minutes) |  | 7.5 | 15.8 | 15.4 |

What we claim is:

1. A process for producing a blending vinyl chloride resin which comprises subjecting a vinyl chloride monomer or a mixture of vinyl chloride and a monomer copolymerizable therewith to suspension polymerization in an aqueous medium using a water-soluble protein, selected from the group consisting of casein and gelatin, as a suspending agent, and treating the resulting polymer with a proteolytic enzyme selected from the group consisting of pepsin, trypsin, chymotrypsin, cathepsin, papain, bromelin, pancreatin, ficin and proteolytic enzymes derived from microorganisms at a temperature of 20° to 70° C., the amount of the proteolytic enzyme used being 0.0001 to 5 parts by weight per 100 parts by weight of the polymer, to decompose the protein.

2. The process of claim 1 wherein said proteolytic enzyme is bromelin or ficin.

3. The process of claim 1 wherein the amount of said proteolytic enzyme is 0.0005 to 2 parts by weight per 100 parts by weight of the polymer.

4. The process of claim 1 wherein the amount of said water-soluble protein is 0.02 to 2 parts by weight per 100 parts by weight of said monomer or monomeric mixture.

\* \* \* \* \*